Figure 1:
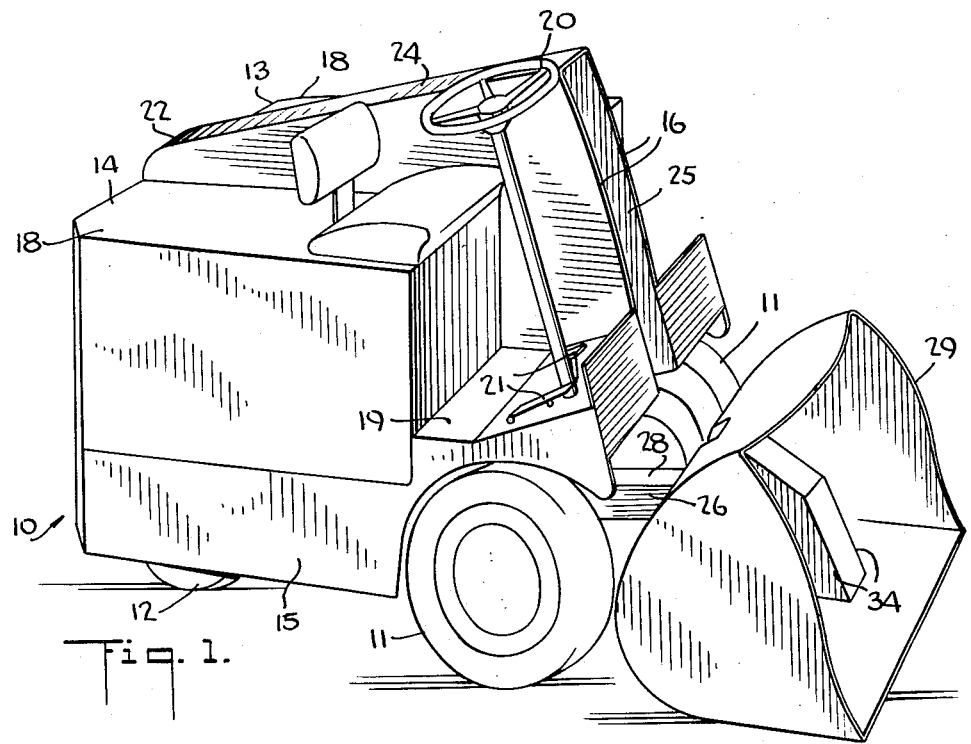

July 31, 1962  B. I. ULINSKI  3,047,172
LIFT TRUCK

Filed July 22, 1959  2 Sheets-Sheet 1

INVENTOR.
B. I. ULINSKI
BY
*J. H. Golden*
ATTORNEY

July 31, 1962 B. I. ULINSKI 3,047,172
LIFT TRUCK
Filed July 22, 1959 2 Sheets-Sheet 2
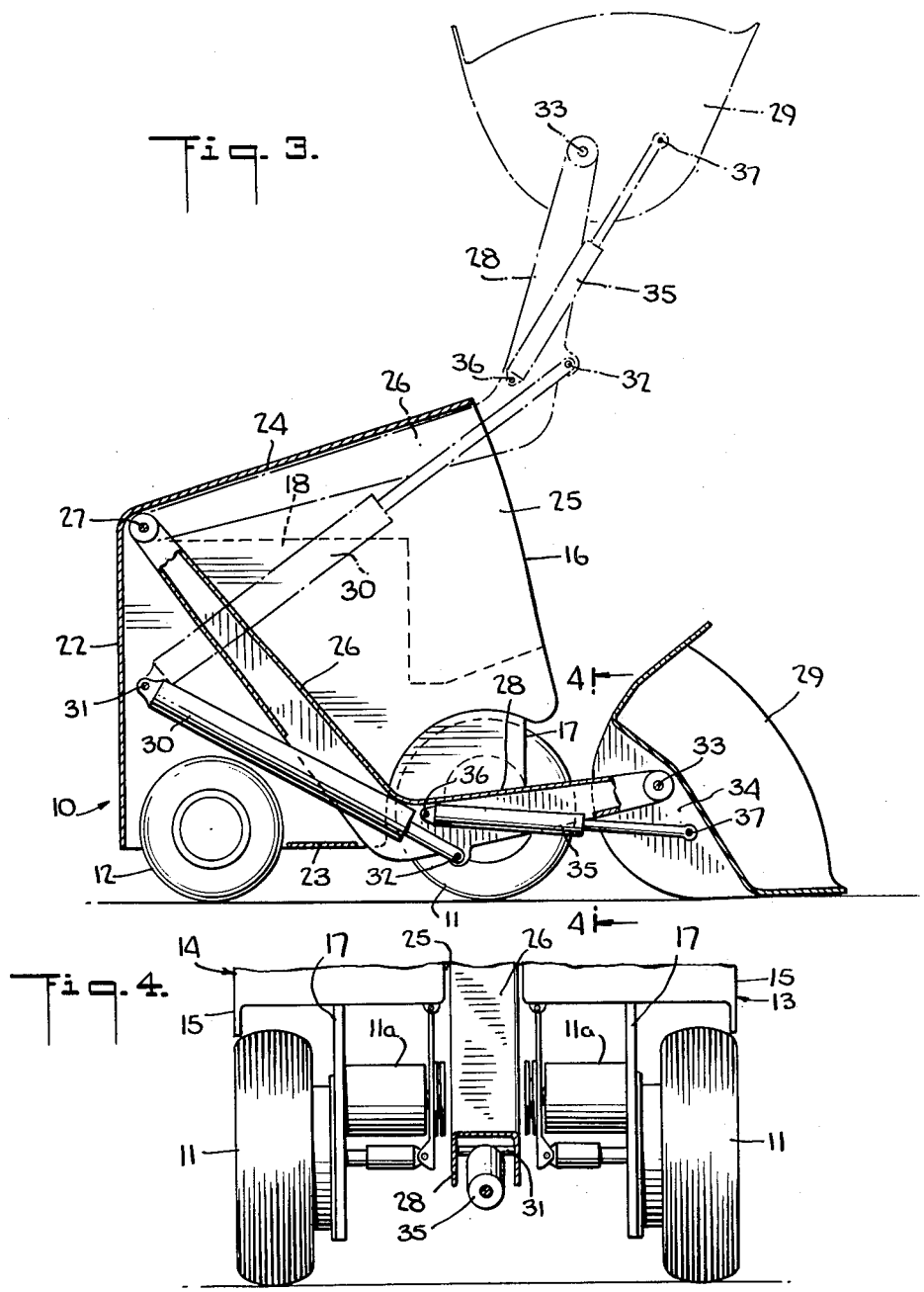
INVENTOR.
B. I. ULINSKI
BY
ATTORNEY 3,047,172
LIFT TRUCK
Bronislaus I. Ulinski, Flossmoor, Ill., assignor to The Yale and Towne Manufacturing Company, Stamford, Conn., a corporation of Connecticut
Filed July 22, 1959, Ser. No. 828,805
5 Claims. (Cl. 214—140)

This invention relates to an industrial truck of the class having a lifting arm that supports a load member such as a shovel.

It will be appreciated that industrial trucks of the particular class often must operate in small spaces such as narrow aisles and the interior of bins and railroad cars, where very considerable restrictions are imposed on the movements of the truck. That creates a problem in the design of the trucks, since they must then be quite short and capable of steering at a very sharp angle. While short, the trucks naturally must be so constructed that the lifting arm can lift the shovel or other load member to a considerable height. Through the concept of my invention, I contribute an exceedingly novel truck that can be maneuvered very well in a small space, while equipped with a lifting arm that will operate in a very satisfactory fashion. Moreover, that arm will offer no hazard to the truck operator or to persons near the truck, and will enable the operator to have excellent visibility.

As an important feature of my invention, I arrange the lifting arm of my truck in a protected position at the longitudinal center of the truck. That arm is pivoted on a rear end portion of the truck, and will contribute lifting through a very considerable distance, but will not obstruct the operator's vision to any great extent when the shovel is in lifted position. More particularly, I so construct the truck that the longitudinally arranged arm actually can move between the front wheels of the truck and past the axis of those wheels. The arm then can be rather closely juxtaposed to the ground when the shovel is in lowered position, enabling the arm to lie below the operator's line of vision when the shovel is fully lifted. Since the arm is arranged at the center of the truck, the operator's field of view will extend not only above the arm but also across practically the entire area at opposed sides of the arm.

When utilizing my novel construction, I do not require lifting mechanism or arms that are juxtaposed to the wheels at the sides of the truck. Those persons skilled in the art thereby will appreciate that I can provide very easy access to the operator's platform, while increasing to a great extent the safety of the operator and other persons near the truck. I can do this while reducing the overall width of my truck, so that the truck will have clearance when moving through narrow openings or passageways. Naturally, I can utilize a wheel base that extends across the full width of the truck, thus contributing to the stability of the truck. It will be appreciated also that utilizing a wide wheel base I allow considerable room beween each wheel and the lifting arm of the truck. That in turn enables me to mount near each wheel a drive motor for that wheel.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Figure 2:
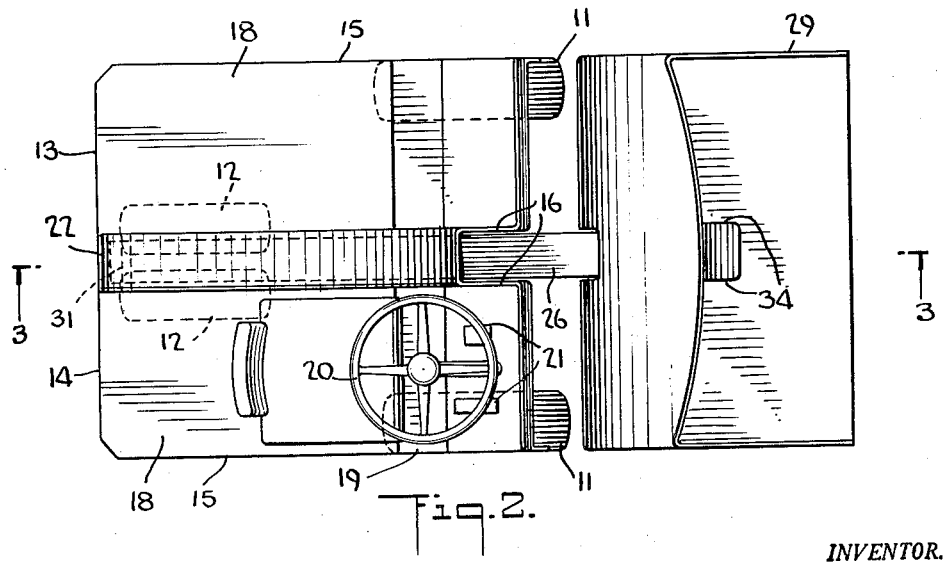

Referring now more particularly to the drawings,
FIG. 1 shows a perspective view of my novel industrial truck;
FIG. 2 is a plan view of my truck;
FIG. 3 is a longitudinal section taken on the line 3—3 in FIG. 2;
FIG. 4 is a section on the line 4—4 in FIG. 3.

Referring now more particularly to FIG. 1 of the drawings, I indicate the main frame of my novel truck generally by the numeral 10, and I show that frame 10 equipped with a pair of front drive wheels 11 and a rear steering wheel 12. I shall refer again to the front drive wheels 11, and I merely call attention here to the fact that I arrange those wheels at the extreme outer sides of the truck, as is well shown in FIG. 2. The particular mounting of the rear wheel 12 is not important to an understanding of my invention, and it is only necessary to realize that wheel 12 enables my truck to be very readily steered.

As an important part of my invention, I construct the main truck frame 10 with opposed side portions 13, 14 that extend longitudinally on the truck. I prefer to make the opposed side portions 13, 14 similar to one another, each of those portions including an outer vertical plate 15, and an inner vertical plate 16 that extends upwardly a considerable distance, as will be seen in FIGS. 1 and 3. Also, each frame side portion 13, 14 has a wheel mounting part 17, best seen in FIG. 4. I utilize each wheel mounting part 17 to support not only a corresponding individual front wheel 11, but also a drive motor 11a for that wheel. Each frame portion 13, 14 may very well be equipped with a battery compartment 18 that extends beteen the corresponding vertical plates 15, 16, and I equip one of the frame portions, as for example the portion 14, with an operator's platform 19 having a usual steering wheel 20 and controls 21.

At the rear of my truck, the main frame 10 has an integral part 22, FIGS. 2 and 3, that extends between the opposed side portions 13, 14 of the frame. I also utilize a lower frame part 23 and an upper part 24 that are integrally secured between the inner vertical plates 16 on the corresponding frame portions 13, 14. Those parts 22, 23, and 24 hold the opposed frame portions 13, 14 in spaced relation to one another, so as to form between the inner plates 16 a vertical opening 25 that extends from a rear portion of the truck forwardly past the operator's platform 19 and through the front of the truck, as will be clearly seen in FIG. 1. In the construction that I prefer, the upper frame part 24 actually will extend along the upper edges of plates 16 whereby to cover the top of opening 25.

My truck has a lifting arm 26, well shown in FIG. 3, that is adapted to move in aligned relation to the vertical opening 25. I mount the arm 26 through a pivot 27 that is supported on an upper part of the frame at the rear of the truck, and preferably between upper portions of the inner vertical plates 16. The lifting arm 26 extends forwardly from its pivot 27, and is formed with a forward angular end portion 28 on which I support a load member or shovel that I indicate generally by the numeral 29. As shown in full lines in FIG. 3, the angular arm portion 28 is so formed as to enable arm 26 to lie at a steep downward angle when the shovel 29 is against the ground. It will be seen that angular portion 28 then is relatively close to the ground, that being possible because the separate mountings 17 of the front truck wheels 11 allow what is in effect a downward extension of the vertical opening 25, so that the arm 26 can move past the axis of those wheels.

For swinging the arm 26, to lift shovel 29, I utilize a hydraulic lift ram 30, FIG. 3, that acts between a pivot 31 on the truck frame 10 and a pivot 32 on the arm 26. I prefer to form the arm 26 as a box section, but with a lower portion of that section cut away, as is indicated in FIG. 3, to allow clearance for ram 30.

When the arm 26 swings to lift shovel 29, as shown in dot and dash lines in FIG. 3, the angular arm portion 28 will extend forwardly and upwardly from opening 25. Thus, it is possible to lift shovel 29 to an extremely high position relatively to the truck, yet that part of arm 26 that extends past the truck operator will remain below the operator's line of vision. It will be appreciated that the upper frame part or cover 24 need not then extend into the line of vision, so that the operator always will have a clear field of view at both sides of the truck.

Referring again to FIG. 3, I mount the shovel 29 on the angular arm portion 28 through a pivot 33, that I arrange at a point that is actually within the shovel. For the particular purpose, I prefer to form the back of shovel 29 with a pocket having spaced sides 34 that will accept the arm portions 28, the pivot 33 being mounted between those sides 34. Through that arrangement I place the pivot point of shovel 29 close to the center of the load in the shovel, and I am able to place the shovel itself in juxtaposed relation to the truck wheels 11. Thereby I can achieve better balance of the load as related both to the shovel and to the truck. In addition, the pivot 33 will be protected against dirt. To rotate the shovel 29 on its pivot 33, I utilize a ram 35 acting between a pivot 36 on arm 26, and a pivot 37 that is arranged within the pocket 34 of the shovel.

It will be seen that the novel truck construction I have described does not require lifting arms that are juxtaposed to the sides or front of the truck wheels 11. Thus, I do not expose the truck operator or persons at the sides of the truck to danger due to the movements of lifting arms. Actually, the lifting arm 26 of my novel truck can be almost entirely enclosed, and will offer no hazard or obstruction to the operator whether he is on the platform 19, or leaving or entering the platform.

It will be appreciated that my novel truck may be quite narrow so as to have greater side clearance when passing through a narrow space, while the truck wheels 11 are placed at the extreme sides of the truck. Thus, I can make the truck more stable without increasing the overall width of the truck. While so placing the wheels, I allow ample room between each wheel 11 and the lifting arm 26 to mount an individual drive motor 11a for the particularly wheel. All of these things I accomplish while utilizing a lifting arm that will lift a shovel or load member to a relatively high position, despite the fact that the truck is quite short.

I believe that the construction and operation of my novel truck will be well understood from the description I have now made, and that the very considerable value of my invention will be fully appreciated by those persons skilled in the art.

I now claim:

1. In a truck of the class described, a main frame having two opposed portions extending longitudinally on the truck, an operator's platform on one of said opposed frame portions, parts of the frame securing said opposed portions in spaced relation to one another to form a vertical opening extending longitudinally through the front of the truck, a transverse part of said frame extending above said vertical opening between the opposed frame portions and positioned below the operator's line of vision, a lifting arm pivoted to a rear part of the truck frame for lifting movement in said opening, said arm extending from its pivot past said operator's platform and supporting a load member at the front of the truck, and an angular end portion of said arm extending upwardly at the front of the truck during the lifting movement of said arm, so that the arm while remaining below said transverse frame part and the operator's line of vision will lift the load member to a relatively high position.

2. In a truck of the class described,
a main frame having two opposed portions extending longitudinally on the truck,
a pair of truck front wheels mounted one independently of the other on each opposed frame portion of the truck,
parts of the frame securing said opposed frame portions in spaced relation to one another to form a vertical opening extending longitudinally between said wheels and through the front of the truck,
an upper part on said frame extending above said vertical opening between the opposed frame portions,
a lifting arm arranged in said opening and supporting a load member for lifting movement relatively to a lowered position close to the ground at the front of the truck,
a rearward portion of said lifting arm pivoted to an upper rearward point on the truck and sharply inclined from the pivot in a downward direction when the load member is in lowered position,
a forward portion of the lifting arm in angular relation to the rearward portion of said arm and moving in the vertical opening between the front wheels as the arm moves the load member relatively to lowered position,
and said forward arm portion extending from the vertical truck opening to effect high lifting of the load member while the arm moves in the opening below said upper part of the frame.

3. In a truck of the class described,
a main frame having two opposed portions extending longitudinally on the truck,
a pair of truck front wheels mounted one independently of the other on each opposed frame portion of the truck,
parts of the frame securing said opposed frame portions in spaced relation to one another to form a vertical opening extending longitudinally through the front of the truck and between said wheels to the ground,
an operator's platform on one of said opposed frame portions
a lifting arm arranged in said opening and supporting a load member for lifting movement relatively to a lowered position at the front of the truck,
a rearward portion of said lifting arm pivoted to a point rearwardly of the operator's platform on an upper part of the truck and sharply inclined from the pivot in a downward direction when the load member is in lowered position,
a forward portion of the lifting arm in angular relation to the rearward portion of said arm and moving past the axis of each front wheel to lie close to the ground when the load member is in lowered position,
and said forward arm portion extending from the vertical truck opening to effect high lifting of the load member while the arm moves in said opening below the operator's line of vision.

4. In a truck of the class described,
a main frame having two opposed portions extending longitudinally on the truck,
a pair of truck front wheels mounted one independently of the other on each opposed frame portion of the truck,
parts of the frame securing said opposed frame portions in spaced relation to one another to form a vertical opening extending longitudinally between said wheels and through the front of the truck,
an operator's platform at one side of said vertical opening on one of the opposed frame portions,
a lifting arm arranged in said opening and supporting a load member for lifting movement relatively to a lowered position close to the ground at the front of the truck, a rearward portion of said lifting arm pivoted to a point rearwardly of the operator's platform on an upper part of the truck and sharply inclined from the pivot in a downward direction when the load member is in lowered position, a forward portion of the lifting arm in angular relation to the rearward portion of said arm and moving in the vertical opening between the front wheels as the arm moves the load member relatively to lowered position, and said forward arm portion extending from the vertical truck opening to effect high lifting of the load member while the arm moves in said opening below the operator's line of vision.

5. In a truck of the class described, a main frame having side portions extending longitudinally on the truck, a pair of truck front wheels mounted one independently of the other on each opposed side portion of the frame, parts of the frame securing said frame side portions in spaced relation to one another to form a vertical opening that extends in the longitudinal axis of the truck, a front portion of said opening extending through the front of the truck and vertically between the wheels, a pair of traction motors for the wheels mounted in positions on the frame side portions and leaving free the vertical opening in the truck axis, a lifting arm pivoted to an upper rearward point on the truck and moving in said vertical opening to lift a load member relatively to a lowered position at the front of the truck, and an angular forward portion of the lifting arm moving past the traction motors as the arm moves the load member relatively to lowered position, enabling the lifting arm to move to a relatively low position between the wheels while utilizing traction motors that are juxtaposed to the wheels.

References Cited in the file of this patent
UNITED STATES PATENTS

| | | |
|---|---|---|
| 2,527,928 | Heath | Oct. 31, 1950 |
| 2,611,579 | Guzey et al. | Sept. 23, 1952 |
| 2,797,002 | Wagner | June 25, 1957 |